May 8, 1956

L. LA V. SPENCER, SR 2,744,411

LIQUID LEVEL GAUGE

Filed May 13, 1955

INVENTOR.
Lorn L. Spencer Sr.

BY

McMorrow, Berman + Davidson
Attorneys

United States Patent Office 2,744,411
Patented May 8, 1956

2,744,411

LIQUID LEVEL GAUGE

Lorn La Vern Spencer, Sr., Croswell, Mich.

Application May 13, 1955, Serial No. 508,215

2 Claims. (Cl. 73—317)

This invention relates to liquid level gauges, and more particularly has reference to a gauge which is adapted to be mounted in any of various tanks, such as oil tanks, water tanks, etc.

One object of importance is to provide a gauge as stated which will be capable of being associated with a tank with maximum speed and ease.

Another object of importance is to provide a gauge as described which will comprise a minimum number of parts, readily connectable to one another, the gauge comprising three main parts, namely a plug, a transparent cover, and a float carrying arm pivotally connected to the plug and having an extension visible through said cover.

A further object of importance is to provide a plug as described which will be particularly designed to seal the opening in which it is mounted, while still permitting full inspection of the position of the pivoted arm of the gauge in relation to a calibrated scale mounted within the cover of the device.

Other objects will appear from the following description, the claims appended thereto, and from the annexed drawing, in which like reference characters designate like parts throughout the several views, and wherein:

Figure 3 is a longitudinal sectional view through the gauge on line 3—3 of Figure 2.

Figure 1:
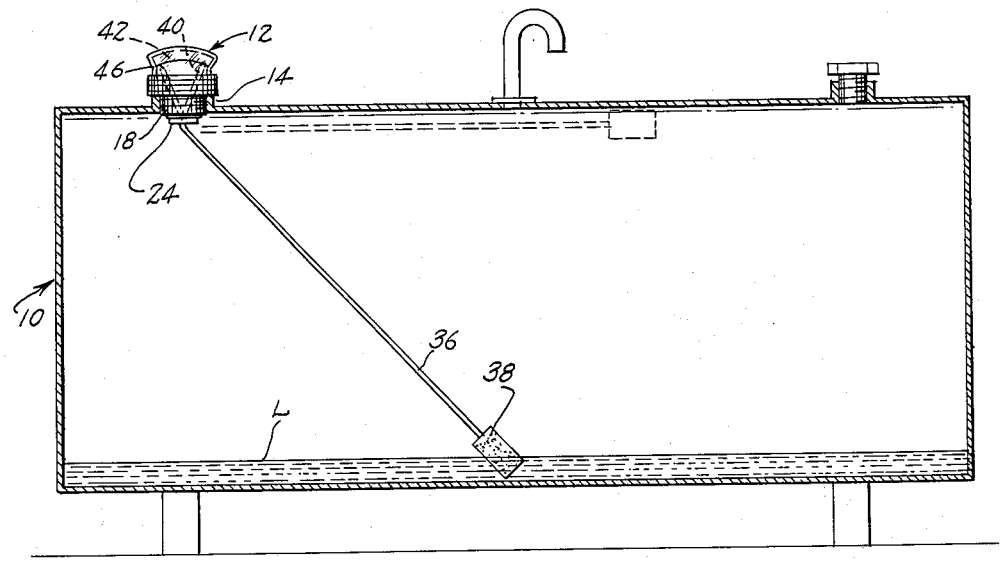
Figure 1 is a longitudinal sectional view through a tank, in association with a gauge formed in accordance with the present invention, the gauge being shown in side elevation.

The reference numeral 10 generally designates a conventional tank, holding a liquid L. The device constituting the present invention has been generally designated at 12, and is mountable in an opening of the tank, the tank wall having an upwardly directed flange 14 extending about said opening, said flange having internal threads 16.

The gauge includes a cup shaped plug 18 externally threaded to engage the threads 16, and having at its upper end an outwardly directed flange 20. Extending about the body of the plug, in contact with the underside of flange 20, is a sealing gasket of neoprene rubber or equivalent sealing material. When the plug is threaded into the opening of the tank, to the maximum extent, gasket 22 will be compressed between the flange 20 and flange 14, to provide a seal between the plug and the tank flange.

Figures 2, 4:
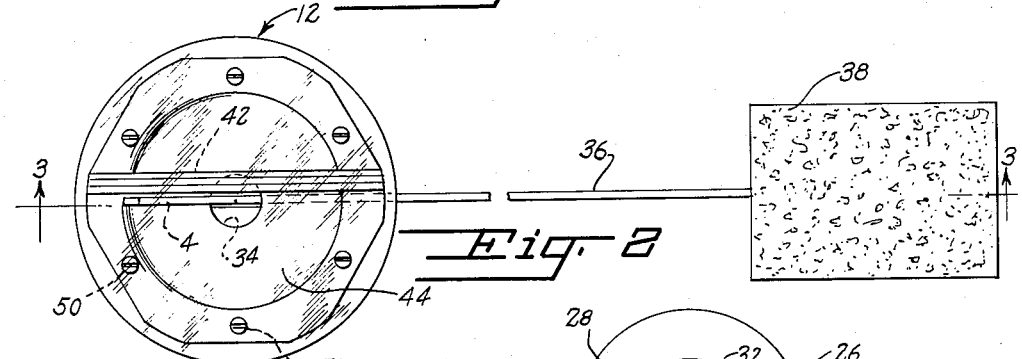
Figure 2 is an enlarged top plan view of the gauge per se, a portion being broken away.
Figure 4 is a plan sectional view, still further enlarged, on line 4—4 of Figure 3.
Figure 5:
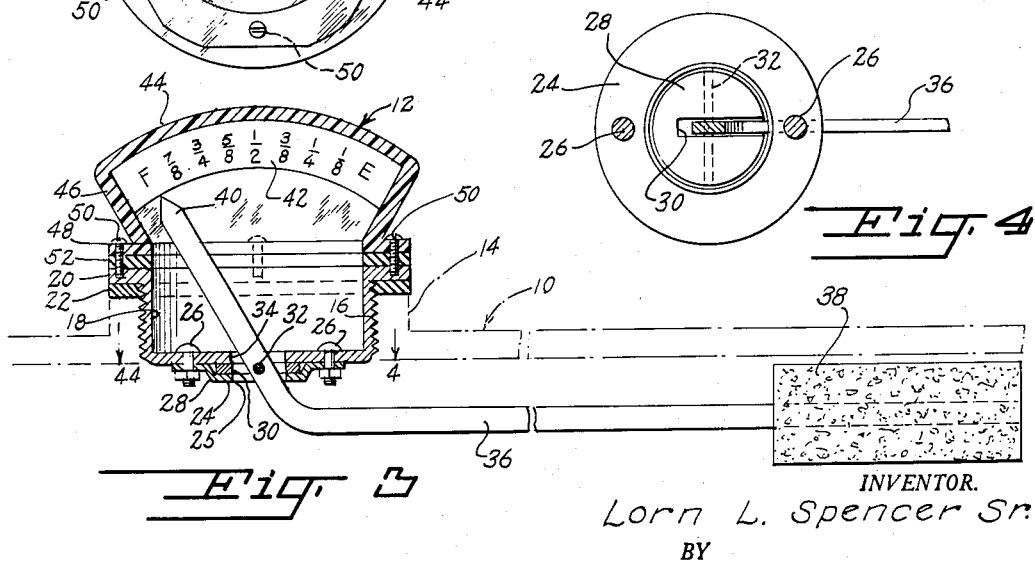

A disc 24, having a downwardly offset center portion, is secured by screws 26 to the plug bottom, and has a circular opening 25 formed in the downwardly offset part thereof. Supported rotatably upon the downwardly offset center part of the disc is a circular washer 28 (Figures 3 and 4) having a diametrically extending slot 30 in registration with opening 25. A cross pin 32 extends diametrically of the washer 28 within the same, and is perpendicularly disposed to the slot 30 so as to extend thereacross.

In registration with opening 25 and slot 30 is a center opening 34 provided in the bottom of the plug 18.

An elongated arm 36 is provided at one end with a float 38 adapted to be supported bouyantly upon the surface of the liquid L, thus to cause the arm to swing upwardly or downwardly as the case may be, with the rise and fall of the liquid. The arm 36, at the end thereof remote from the float, has an angular extension 40, said extension 40 having adjacent its juncture with the main portion of the arm a small opening through which the pivot pin 32 extends, thus to pivotally mount the arm upon the plug for swinging movement about a horizontal axis.

The upper, free end of extension 40 is adapted to traverse an arcuate scale 42 calibrated to show different liquid levels in a descending order of value. The scale is curved about the pivot axis 32, and is mounted against the underside of a correspondingly curved, dome-like center portion 44 of a transparent cover 46 of plastic material or the like, having at its base an outwardly directed circumferential flange 48 connected by screws 50 to the flange 20 of the plug body.

Interposed between the flanges 48, 20 is an annular sealing gasket 52, which is held under compression when the cover is secured to the plug body.

It will be seen that the arrangement is one which provides for an effective sealing of the opening in which the plug is mounted, despite the fact that there is disposed in plain view of the observer the scale 42 and the arm 40, with said arm being extended through openings formed in the plug which ordinarily would prevent sealing, but which in the present instance have no adverse effect on the sealing arrangement in view of the fact that said openings are formed in the bottom of a plug which is sealably engaged with the edge of the tank opening in which it is mounted, and in view of the fact, further, that the cover, through which the index arm or extension 40 and the scale 42 are observed, is in turn sealably connected to the plug body.

The entire unit is mounted in association with a tank merely by extension of the arm 36 and float 38 into the tank, after which the plug body is threaded into the flange 14. While the plug body is being rotated to threadedly engage the same in the opening of the tank, the upper end of the index arm 40 is grasped, to prevent rotatable movement of said arm. The washer 24 is freely rotatable between the plug bottom and the downwardly offset center portion of the disc, and of course, the disc and the plug body, though being rotated as one, do not bind against the arm tending to rotate the same, since the disc opening 25 and the plug body opening 34 are circular.

After the plug has been fully threaded into the flange of the tank opening, the cover 44 is secured by the screws 50 to the flange 20 of the plug body, and the device is ready for use.

It will be seen that the device is characterized by its ease of assembly, and also by its adaptability to provide a sealed connection between the gauge and the tank opening. Still further, the invention has the desirable characteristic wherein it is fully rotatable, when being threaded into or out of the conventional threaded opening of a tank, without tending to rotate the arm thereof, despite the length of the arm and despite is pivotal connection to the plug portion of the structure.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A liquid level gauge for mounting in a threaded opening of a tank, comprising a generally cylindrical plug of cup shape having external threads adapted to engage the threads of said opening, said plug including a bottom formed with a center opening, the plug further including a disc secured to and underlying said bottom and offset downwardly from the bottom, the disc having a slot formed therein, the plug including an outwardly directed flange and a sealing gasket underlying said flange, for sealably mounting the plug in said opening of the tank; a dome-like, transparent cover having an outwardly directed peripheral flange overlying the flange of the plug; gasket means interposed between the flanges of the cover and plug respectively, said flanges being connected to provide a seal between the cover and plug; a scale within said cover calibrated to show liquid levels in a descending order, said scale being disposed for viewing of the same through the cover; an elongated arm including an angular extension at one end, said extension being pivotally connected to said disc and extending within the center opening of the plug and through said slot, the extension having a free end disposed to traverse said scale to indicate the liquid level within the tank responsive to swinging of the arm to different positions within the tank; and a float on the arm within the tank, for shifting the arm about the pivot axis thereof responsive to movement of the float with the rising or falling level of liquid within the tank.

2. A liquid level gauge for a tank having a threaded opening, comprising an externally threaded, cup-like plug body adapted to be engaged with the threads of the tank opening, said plug body having a bottom formed with a center opening; a disc secured to the underside of the plug bottom, and having a downwardly offset center portion formed with a circular opening registering with the opening of the plug bottom, said plug bottom and the downwardly offset center portion of the disc defining a space therebetween; a washer rotatably mounted in said space and having a diametrically extending slot; a pin extending diametrically of the washer within the same normally to the length of the slot; an arm extending through the registering openings and slots and having an opening receiving the pin, to pivotally mount the arm for swinging movement about a horizontal axis; a transparent, dome-like cover detachably secured to and overlying the plug body, one end of the arm projecting upwardly within the plug body into said cover so as to be visible through the cover; a scale mounted in said cover in position to be viewed therethrough, said one end of the arm traversing said scale on pivotal movement of the arm; and a float carried by the other end of the arm.

References Cited in the file of this patent

UNITED STATES PATENTS

| | | |
|---|---|---|
| 1,002,557 | Richard et al. | Sept. 5, 1911 |
| 1,463,342 | Stanley | July 31, 1923 |
| 2,173,019 | Johansson | Sept. 12, 1939 |
| 2,446,844 | Molaver | Aug. 10, 1948 |